April 26, 1966  A. M. FRIEDMAN  3,248,040
DOUBLE-WALL FLEXIBLE PACKAGE
Filed Sept. 18, 1964

INVENTOR
ARTHUR MURRAY FRIEDMAN

BY

ATTORNEY

United States Patent Office 3,248,040
Patented Apr. 26, 1966

3,248,040
DOUBLE-WALL FLEXIBLE PACKAGE
Arthur Murray Friedman, Wilmington, Del., assignor to
E. I. du Pont de Nemours and Company, Wilmington,
Del., a corporation of Delaware
Filed Sept. 18, 1964, Ser. No. 397,594
7 Claims. (Cl. 229—55)

This invention relates to packages and, more particularly, to flexible, double-wall bags and pouches.

Many types of flexible bag containers and pouches are known both with respect to the construction of the container and to the type or types of pellicles from which the container is made. A long sought goal has been a package which offers both superior protection and high durability at a cost which is sufficiently low to be practicable. However, no completely satisfactory bag offering all of these features has been available to this time. Combining, for example, a web of regenerated cellulose film coated with a vinylidene chloride copolymer (used for its low permeability to moisture and oxygen) with a web of polyethylene film (used for its high durability) in a double-wall bag is not satisfactory because these two films do not seal satisfactorily to one another. To this time there has been no single film or combination of known films which offers all the desired features listed hereinabove.

It is, therefore, an object of the present invention to provide a flexible package which is at the same time highly protective, durable, and economical. These and other objects will appear hereinafter.

The objects of the present invention are accomplished by a double-wall package formed of an outer wall of regenerated cellulose film coated on both sides with a vinylidene chloride copolymer coating and a further coating on one side of a polyolefin and an inner wall which is a pellicle, at least the two surfaces of which are a polyolefin, wherein the polyolefin coated side of the outer wall faces the inner wall.

Bags and pouches exemplary of the present invention are shown in the drawings, wherein.

Figure 1:
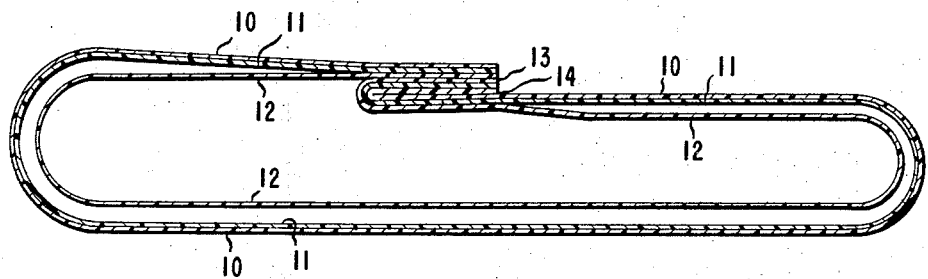
FIGURE 1 shows a cross-section view of a double-wall bag.

In the drawings, two side vinylidene chloride copolymer coated regenerated cellulose film 10 further coated on one side with a polyolefin 11 serves as the outer wall of the double-wall package. The inner wall of the package 12 is a pellicle, at least the two surfaces of which are a polyolefin. Preferably, this inner wall is a polyolefin film, particularly a polyethylene film.

Figure 2:
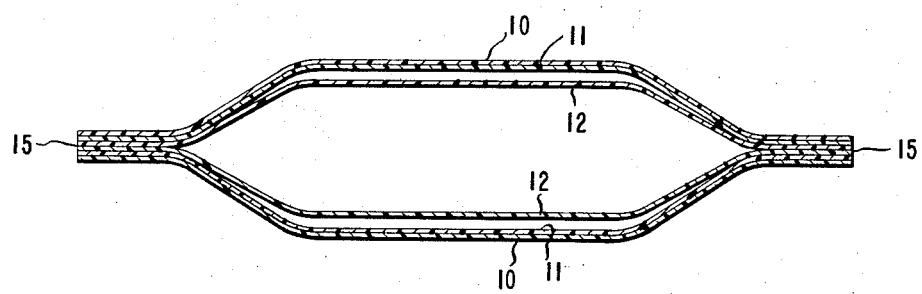
FIGURE 2 shows a cross-sectional view of a double-wall pouch having flat, uncrimped seals.

In FIGURE 1, vertical seam 13 along the rear of the package is a fin-type heat-seal which has been made to lie flat and is sealed against the body of the package at 14. The top and bottom seals (not shown) of the package are typical crimped heat-seals. In FIGURE 2, the seals 15 along all four sides of the pouch are fin-type uncrimped heat-seals.

The invention can be practiced in the preparation of various types of known double-wall flexible packages. In the preparation of these packages, it is critical that the structure be such that no attempt is made to seal the exposed vinylidene chloride copolymer coating of the outer wall to any polyolefin surface, i.e., either side of the inner wall or the reverse side of the outer wall.

Materials suitable for the inner wall of the package are polyolefin films such as polyethylene, polypropylene or polypropylene coated on both sides with polyethylene; paper coated on both sides with a polyolefin such as polyethylene; and metal foil coated on both sides with a polyolefin such as polyethylene. It is only necessary when employing the polyolefin or copolyolefin material as the inner wall that the particular material have a softening point below about 110° C.

As mentioned above, the outer wall is a regenerated cellulose film coated on both sides with a vinylidene chloride copolymer coating and further coated on one side with a polyolefin. The regenerated cellulose film can be prepared in any conventional manner, such as from cellulose xanthate by the viscose process, from cuprammonium cellulose, or from solutions of cellulose in salt solutions such as calcium thiocyanate, by methods well-known in the art. The method of preparation is not critical. It can be softened with any of the known softeners, such as glycerin, propylene glycol, etc. When the regenerated cellulose sheet is prepared by the viscose process, it is preferred that it be prepared by a casting process which yields a strong sheet, such as described in U.S. Patent 2,862,245 to Reichel et al., or in U.S. Patent 3,073,733 to Mitchell.

The regenerated cellulose sheet is customarily impregnated with an anchorage resin which serves to bond the coating to the regenerated cellulose. The anchorage resin can be a polyalkylenimine having from 2 to 8 carbon atoms, such as polyethylenimine, or a thermosetting resin such as urea-aldehyde, melamine-aldehyde, melamine-urea-aldehyde, melamine - formaldehyde - polyalkylene-polyamine, guanidine - urea - aldehyde, guanidine - carbamide-aldehyde or mixtures thereof.

A vinylidene chloride copolymer coating is applied to both sides of the regenerated cellulose sheet. These copolymers comprise essentially those polymers obtained by polymerizing a mixture of from 35 to 96% by weight vinylidene chloride, from 0 to 25% by weight itaconic acid and from 3 to 40% by weight of at least one polymerizable monomer from the group consisting of acrylonitrile, alkyl esters of acrylic and methacrylic acids having from 1 to 18 carbon atoms in the alkyl group, phenyl methacrylate, cyclohexyl methacrylate p-cyclohexylphenyl methacrylate, methacrylonitrile, methyl vinyl ketone, and vinyl chloride. It is preferred to use a polymer containing 80 to 96.5% by weight vinylidene chloride, 0.1 to 5.0% by weight itaconic acid and 3.0 to 19.9% by weight of at least one of the polymerizable monomers listed above. Such coatings are described in U.S. Patent 2,570,478 to Pitzl. Use of a polymer coating of this type provides a film having low permeability to water vapor and other gases. The coating is usually applied as a solution in an organic solvent; however, some vinylidene chloride copolymers can be applied as an aqueous polymer emulsion. Conventional coating apparatus such as doctor rolls, kiss rolls, doctor knives or air knives can be employed to apply the coating.

Various waxes, particulate antiblocking agents, etc., may be added in known fashion to the vinylidene chloride copolymer coating. An especially preferred coating for the film of this invention comprises 100 parts by weight of a vinylidene chloride copolymer, 1 to 6 parts by weight of candelilla wax, 1 to 3 parts by weight of calcium stearate, 0.1 to 1 part by weight of an organic carboxylic acid, 0.1 to 2.0 parts by weight of particular antiblocking agent, and 1 to 2 parts by weight of stearamide.

The coated film is then primed on one side with a polyalkylenimine applied from aqueous solution, alcoholic solutions or solutions in other organic media. The polyalkylenimine solution can be applied to the film by roll or brush applicators, by spraying or other means known in the art. Other primers, such as a side variety of organic titanates, can also be used. Surface active agents can also be applied to the primed film in order to avoid possible blocking of the primed film when wound into roll form.

On the primed side of the film, a layer of a polyolefin, preferably polyethylene, is extrusion coated as known in the art. The polyolefin coating preferably contains a small amount (about 50 to 100 p.p.m.) of an antioxidant, and a small amount (about 0.1 to 0.3%) of a waxy material which acts as a surface lubricant, such materials being well known in the art.

The polyolefin surface of the outer wall is then treated by subjecting it to an electrical or electrostatic discharge treatment, by passing the film between spaced electrodes as shown, for example, in U.S. Patents 3,018,189 and 3,113,208 to Traver. The treatment is preferred in order that the film be printable on its polyolefin surface. Most of the film used in making the packages of this invention will carry printing on the polyolefin surface of the outer wall. Although it is also possible to treat and print the inner wall of the package, this is less often done than reverse printing of the outer wall of the package.

The packages of this invention can be made on virtually any type of machine capable of manufacturing a double-wall flexible bag.

The bags can be made, for example, on a so-called make-and-fill type packaging machine. In such a machine, the two continuous webs are formed continually but intermittently into a continuous cylindrical double-wall tubing around a vertical hollow forming tube through which articles of commerce are intermittently fed into the tubing by gravity. As the double-wall tubing is advanced continually but intermittently, it is formed into a series of filled bags, the top and bottom seals thereof being formed in succession by a pair of opposed and cooperating crimped sealing bars. Just after the top seal of a filled bag is formed, the said bag is severed from the tubing above it and emerges from the machine.

The bags may also be made in a machine which simply fabricates unfilled bags, which are stored and then later used for packaging various articles of commerce. It is also possible to make pouches on a machine suitable for fabricating that type of package as is known in the art.

To further illustrate the invention, reference is made to the following example.

Double-wall bags are prepared on a make-and-fill type packaging machine. The outer wall of the bag is a regenerated cellulose film having a unit weight of 25 grams/sq. meter, carrying 3.1 grams/sq. meter of a coating comprising a vinylidene chloride/acrylonitrile/itaconic acid copolymer, in the ratio of 90.7/9.0/0.3, distributed approximately equally on the two sides of the film, primed on one side with a mixture of 7.5 milligrams/sq. meter of polyethylenimine and 3 milligrams/sq. meter of sodium lauryl sulfate, and further coated on the primed side by extrusion coating with 6 grams/sq. meter of a branched polyethylene having a density of 0.92 gram per cc., and finally treated on the extrusion coated side with an electrostatic discharge of 0.2 watt-minutes/sq. foot. The inner wall of the bag is a 1.25 mil polyethylene film. The polyethylene coated side of the outer wall faces the inner wall of the container. The back seam of the bag is the flat fin-type seal as shown in FIGURE 1. The top and bottom seals of the bag are crimped heat-seals. No problems are encountered in forming either the back heat-seal or the top and bottom crimp heat-seals of the bag during manufacture.

During a control run employing a vinylidene chloride copolymer coated regenerated cellulose film as the outer wall of the container, and the same polyethylene film as the inner wall, the bags could not be prepared because the two films would not seal to each other.

The bags and pouches of this invention provide a sanitary and hermetically sealed container which is highly durable, highly protective, inexpensive, and economical.

What is claimed is:

1. A double-wall package for articles formed of an outer wall of regenerated cellulose film coated on both sides with a vinylidene chloride copolymer coating and a further coating on one side of a polyolefin and an inner wall which is a pellicle, at least the two surfaces of which are a polyolefin, wherein the polyolefin coated side of the outer wall faces the inner wall.

2. The double-wall package of claim 1 wherein the inner wall pellicle is a film of polyethylene and the polyolefin coating on the outer wall is polyethylene.

3. The double-wall package of claim 1 wherein the inner wall pellicle is paper coated on both sides with polyethylene and the polyolefin coating on the outer wall is polyethylene.

4. The double-wall package of claim 1 wherein the inner wall pellicle is a polypropylene film coated on both sides with polyethylene and the polyolefin coating on the outer wall is polyethylene.

5. A double-wall flexible bag formed of an outer wall of regenerated cellulose film coated on both sides with a vinylidene chloride copolymer coating and a further coating on one side of polyethylene and an inner wall of polyethylene film, the polyethylene coated side of the outer wall facing the polyethylene inner wall.

6. The double-wall bag of claim 5 wherein the vinylidene chloride copolymer comprises about 80–96.5 parts of vinylidene chloride, 0.1 to 5 parts of itaconic acid and 3 to 19.9 parts of at least one other polymerizable monomer.

7. The double-wall bag of claim 6 wherein there is a printing on the surface of the polyethylene coating of the outer wall.

References Cited by the Examiner
UNITED STATES PATENTS

| | | | |
|---|---|---|---|
| 2,201,416 | 5/1940 | Wagner | 229—3.5 |
| 2,554,157 | 5/1951 | Snyder | 229—55 |
| 2,635,742 | 4/1953 | Swartz et al. | 229—3.5 X |
| 2,679,968 | 6/1954 | Richter | 229—3.5 |
| 2,704,382 | 3/1955 | Kreidl. | |

JOSEPH R. LECLAIR, *Primary Examiner.*